United States Patent [19]

Keith

[11] Patent Number: 5,587,053
[45] Date of Patent: Dec. 24, 1996

[54] BOILER/CONDENSER ASSEMBLY FOR HIGH EFFICIENCY PURIFICATION SYSTEM

[75] Inventor: Robert C. Keith, Redondo Beach, Calif.

[73] Assignee: Grano Environmental Corporation, Carson, Calif.

[21] Appl. No.: 320,233

[22] Filed: Oct. 11, 1994

[51] Int. Cl.$^6$ ............................................. B01D 3/00
[52] U.S. Cl. ..................... 202/172; 159/28.6; 165/165; 165/166; 202/182; 202/186; 202/202
[58] Field of Search ..................... 202/182, 172, 202/202, 186, 235; 159/28.6, 47.1; 165/166, 167, 164–165; 203/26

[56] References Cited

U.S. PATENT DOCUMENTS

| | | | |
|---|---|---|---|
| 3,256,704 | 6/1966 | Becker | 165/166 |
| 3,537,513 | 11/1970 | Inglewood | 165/166 |
| 4,186,159 | 1/1980 | Haber | 261/DIG. 72 |
| 4,296,050 | 10/1981 | Meier | 261/DIG. 72 |
| 4,305,210 | 12/1981 | Christensen et al. | 34/583 |
| 4,671,856 | 6/1987 | Sears | 203/22 |
| 4,976,313 | 12/1990 | Dahlgren et al. | 165/167 |
| 5,028,333 | 7/1991 | Wright et al. | 210/237 |
| 5,193,611 | 3/1993 | Hesselgreaves | 165/165 |

FOREIGN PATENT DOCUMENTS

| | | | |
|---|---|---|---|
| 0043270 | 9/1913 | Sweden | 165/167 |
| 2099713 | 12/1982 | United Kingdom | 159/28.6 |

OTHER PUBLICATIONS

Tranter, Inc., *Superchanger*, pp. 1, 2, 3, 6, 9 and 11.

*Primary Examiner*—Virginia Manoharan
*Attorney, Agent, or Firm*—Brady, O'Boyle & Gates

[57] ABSTRACT

A boiler/condenser assembly for a high efficiency purification system including a plate-in-frame type heat exchanger wherein vertically extending common plate members are provided with corrugated faces having herringbone configurations constructed and arranged to provide a plurality of contact points where the condensing surfaces of adjacent common plate members defining a condensing chamber come into near or direct contact which serve as accumulation points for the liquid forming on the condensing surfaces of both common plate members. The accumulated liquid is caused to flow off the condensing surfaces in a plurality of diagonal liquid flow paths.

3 Claims, 3 Drawing Sheets

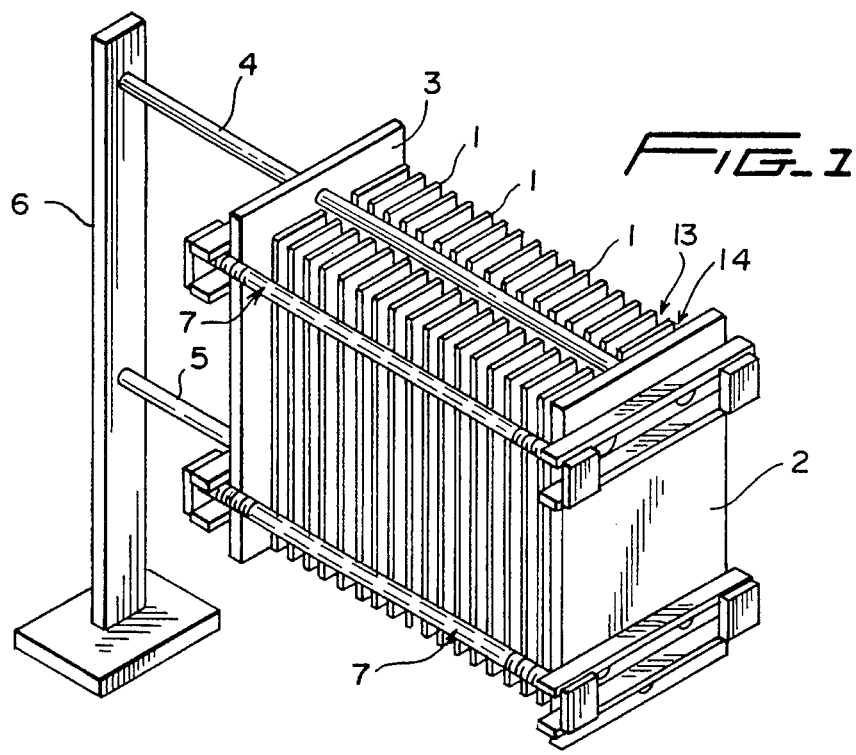
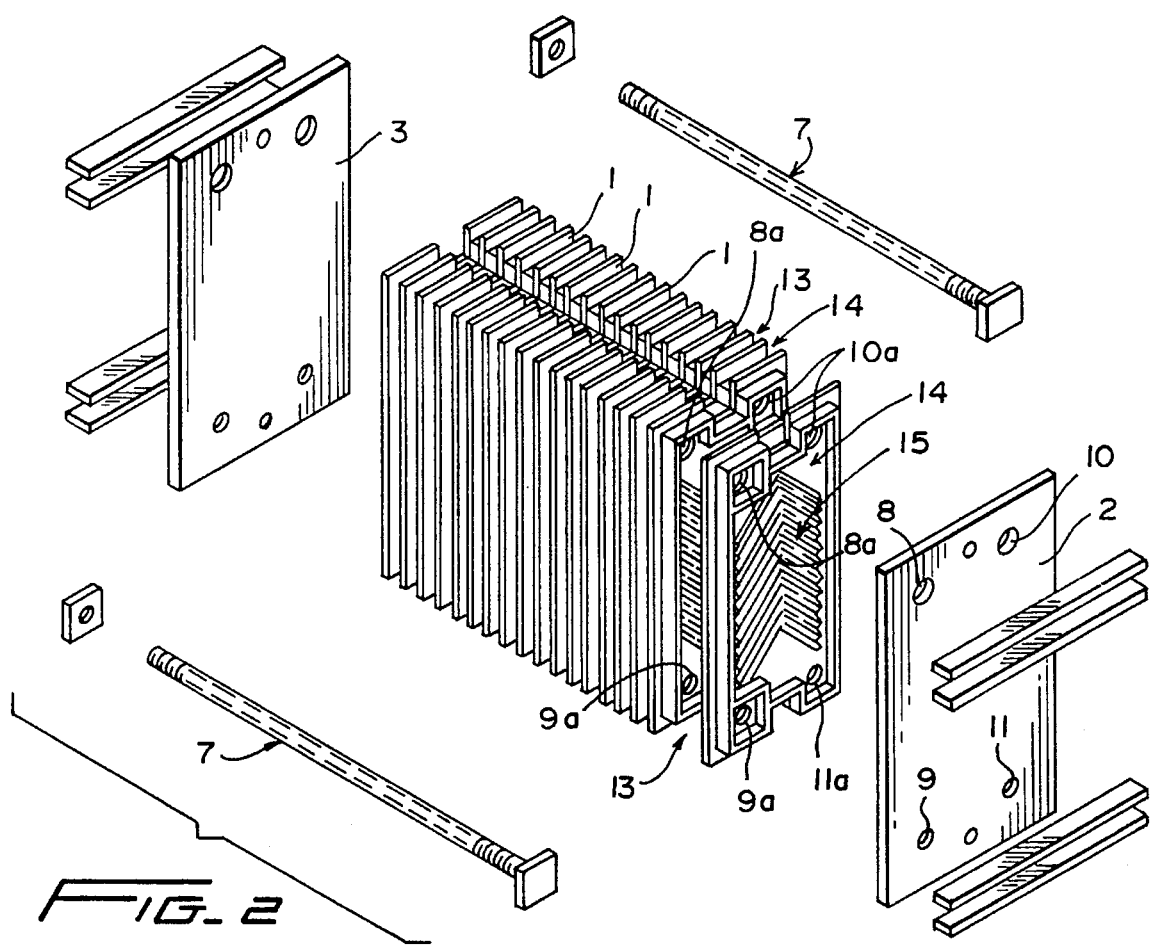

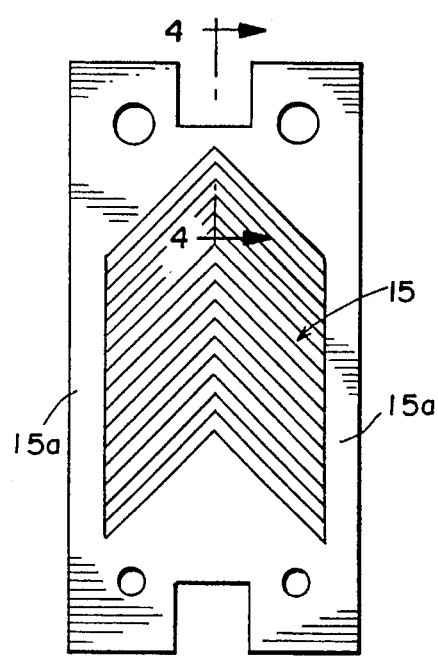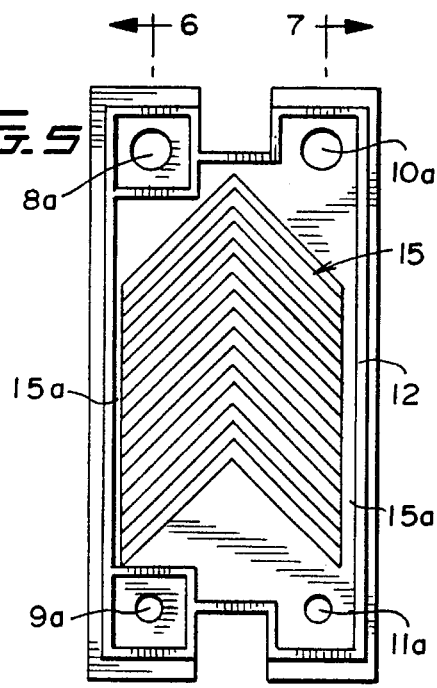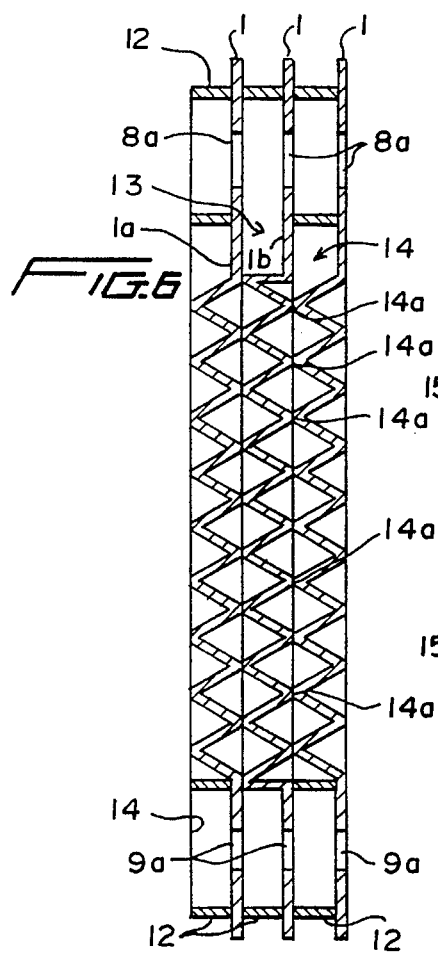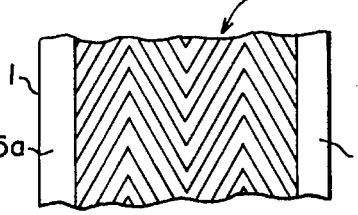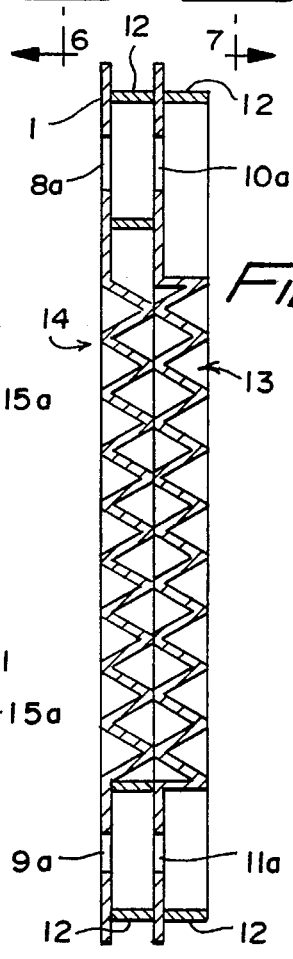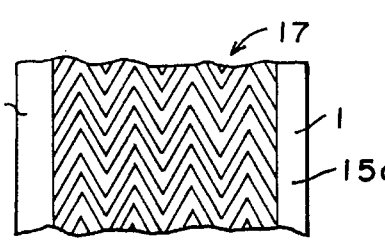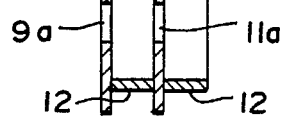

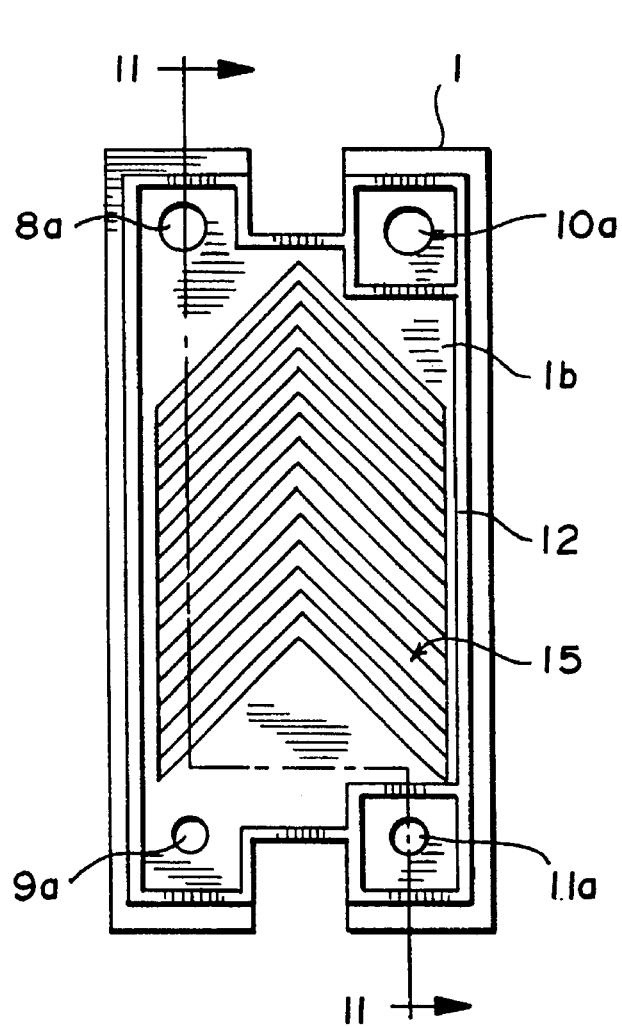
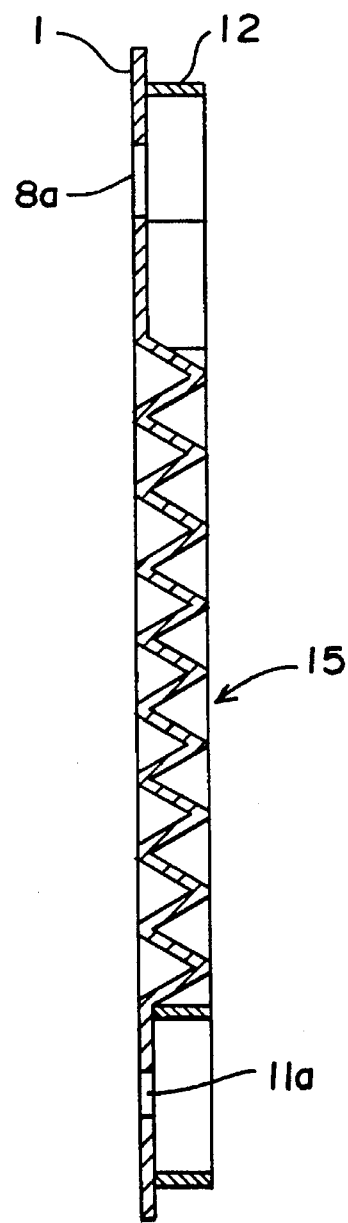
FIG. 10
FIG. 11

BOILER/CONDENSER ASSEMBLY FOR HIGH EFFICIENCY PURIFICATION SYSTEM

BACKGROUND OF THE INVENTION

Distillation is employed in purification systems for removing or extracting contaminants from liquids by a process of evaporation. The simplest example of distillation is one in which the entire process is carried out by heating and cooling the liquid, wherein the liquid to be purified is introduced into a boiling chamber where the liquid's temperature is raised to the boiling point of the contaminant to be extracted. Subsequent addition of heat no longer raises the temperature of the contaminated liquid but serves only to vaporize the contaminate to be extracted. The vapor produced in the boiling chamber is then conveyed into a condensing chamber where it is cooled until it condenses and becomes pure liquid called "condensate".

To improve the energy efficiency of the distillation process, vapor compression is employed to recycle the heat used to vaporize the liquid. In vapor compression distillation, the vapor produced in the boiler is compressed before it is transferred to the condenser, whereby the condenser is maintained at a higher temperature than the boiler, and the heat released by the vapor as it condenses can be driven back into the boiler to produce more vapor.

Initially, most vapor compression distillation systems employed shell-in-tube type heat exchangers for their boiler/condenser assemblies; however, the construction and arrangement of the tubes presented an inadequate amount of surface area for heat transfer at low differential temperatures, and at higher differential temperatures the efficiency of the vapor compression distillation process was greatly reduced.

To overcome the disadvantages experienced with shell-in-tube type heat exchangers, a plate-in-frame type heat exchanger has been proposed to provide a boiler/condenser assembly, as disclosed in U.S. Pat. No. 4,671,856, wherein the boiling and condensing stages of the vapor compression distillation process takes place by conveying the feed material into a series of alternating boiling and condensing chambers on opposite sides of vertically extending common plate members. The feed material is then caused to boil evenly over substantially the entire boiling surface of the common plate member. The heat required to boil the feed material in the boiling chamber is almost entirely provided by the vapor condensing at a higher temperature in the adjacent condensing chamber. As compressed vapor condenses in the condensing chamber, on the opposite side of the common plate member, its heat of vaporization is directed back into the boiling chamber, through the common plate member under the influence of the differential temperature which exists between the adjacent boiling and condensing chambers.

The boiler/condenser described in U.S. Pat. No. 4,671,856 employs flat plates for the vertically extending common plate members, whereby the vapor condenses on the plate in a thin film which flows by gravity vertically downwardly on the surface of the plate, resulting in a film thickness profile which varies in the vertical direction from the top of the plate to the bottom thereof, whereby the thickness of the film at the bottom of the plate is greater than at the top. Since the local heat transfer coefficient between the film and the surface of the common plate member varies inversely with the condensing film thickness, the overall heat transfer from the condensing chambers to the boiling chambers becomes increasingly less from the top of the plate where the thickness of the film is relatively thin, to the bottom of the plate where the thickness of the film is relatively thick.

The boiler/condenser assembly of the present invention is an improvement over the boiler/condenser assembly disclosed in the above-mentioned U.S. Pat. No. 4,671,856 in that the flow path of the condensing film is shortened, and consequently its thickness is decreased to thereby improve the overall heat transfer between the boiling and condensing chambers.

SUMMARY OF THE INVENTION

The boiler/condenser of the present invention comprises, essentially, a plate-in-frame type heat exchanger of the type disclosed in U.S. Pat. No. 4,671,856, but rather than using flat plates for the vertically extending common plate members, corrugated plates having a herringbone configuration are employed to provide a slanted flow path for the condensing film causing it to flow down the condensing surface at an angle, rather than directly downward. The condensing film is collected into run-off streams which carry a comparatively large volume of liquid off the plates while occupying a comparatively small portion of their total surface area. By redirecting the condensing film into run-off streams, a majority of the liquid on the plate is caused to occupy a minority of the plate's area. The condensing film which remains to cover the condensing surface is therefore much thinner and the overall heat transfer coefficient between the condensing film and the common plate member is increased, whereby the overall heat transfer across the corrugated plate is greater than the overall heat transfer for a flat plate with comparable dimensions.

In order to achieve this improved efficiency, the condensing surface of each corrugated, herringbone common plate member is constructed and arranged to provide a plurality of contact points where the condensing surfaces of adjacent common plate members defining a condensing chamber come into near or direct contact. These contact points serve as accumulation points for the liquid forming on the condensing surfaces of both common plate members. The accumulated liquid is caused to flow off the condensing surfaces in a plurality of diagonal liquid flow paths and into run-off streams, and a plurality of diagonal vapor flow paths, adjacent the diagonal liquid flow paths, direct the vapor conveyed into the condensing chambers diagonally across the condensing chambers, rather than vertically downward, in order to assist the flow of liquid off the condensing surfaces.

BRIEF DESCRIPTION OF THE DRAWINGS

FIG. 1 is a perspective view of the boiler/condenser of the present invention;

FIG. 2 is an exploded view of the boiler/condenser shown in FIG. 1;

FIG. 3 is a front elevational view of the heat transfer surface on one side of a heat exchanger plate employed in the boiler/condenser of the present invention;

FIG. 4 is a view taken along line 4—4 of FIG. 3;

FIG. 5 is an elevational view of the heat transfer surface on the opposite side of the heat exchanger plate shown in FIG. 3 and showing the arrangement of the gasket for isolating the boiler vapor channel and the boiler liquid channel from the heat transfer surface;

FIG. 6 is a view taken along line 6—6 of FIG. 5 showing a plurality of heat exchanger plates in abutting relationship to form alternating boiling and condenser chambers;

FIG. 7 is a view taken along line 7—7 of FIG. 5;

FIG. 8 is a fragmentary, front elevational view illustrating another embodiment of the herringbone configuration of the heat exchanger plate;

FIG. 9 is a fragmentary, front elevational view illustrating still another embodiment of the herringbone configuration of the heat exchanger plate;

FIG. 10 is an elevational view of a heat exchanger plate similar to FIG. 5 showing the arrangement of the gasket for isolating the condenser vapor channel and condenser liquid channel from the heat transfer surface; and FIG. 11 is a view taken along line 11—11 of Figure 10.

DESCRIPTION OF THE PREFERRED EMBODIMENTS

Referring to the drawings and more particularly to FIGS. 1 and 2, the boiler/condenser assembly of the present invention comprises a conventional plate-in-frame type heat exchanger having a plurality of vertically extending heat exchanger plates 1 positioned in spaced, abutting relationship between a frame plate 2 and a pressure plate 3. The plates 1 are held in alignment by guide bars 4 and 5 extending from the frame plate 2 through the pressure plate 3 and secured to a column 6, and a plurality of compression bolt assemblies 7 extend between the frame plate 2 and the compression plate 3. The frame plate 2 is provided with a plurality of ports 8, 9, 10 and 11 aligned with corresponding ports 8a, 9a, 10a and 11a provided in each of the plates 1, with the ports 8a, 9a, 10a and 11a in the plates 1 being aligned with the corresponding ports 8a, 9a, 10a and 11a in the next adjacent plate 1. When the plates 1 are assembled, aligned ports 8a form the boiler vapor channel; aligned ports 9a form the boiler liquid channel; aligned ports 10a form the condenser vapor channel; and the aligned ports 11a form the condenser liquid channel.

As will be seen in FIG. 5, one face of each of the plates 1 is provided with a gasket 12 constructed and arranged to isolate boiler vapor channel ports 8a and boiler liquid channel ports 9a from the heat transfer surface 1a on the face of plate 1. Similarly, as will be seen in FIG. 10, the gasket 12 is secured to the face of another plate 1 in a manner so as to isolate condenser vapor channel ports 10a and condenser liquid channel ports 11a from the heat transfer surface 1b on the corresponding face of the next adjacent plate. As will be seen in FIG. 3, the back or opposite face of each plate 1 has no gasket so that when the plurality of plates 1 are assembled, as shown in FIGS. 1 and 2, the gaskets 12 are compressed to form a seal between adjacent plates 1 to thereby provide a series of alternating boiling chambers or cells 13 and condensing chambers 14.

Ports 8, 9, 10 and 11 in frame plate 2 are aligned respectively with boiler vapor ports 8a, boiler liquid ports 9a, condenser vapor ports 10a, and condenser liquid ports 11a to allow fluid to be transported through the boiling and condensing cells 13 and 14; thus, boiler liquid port 9 is used to inject feed and extract concentrate from the boiling chambers 13. The boiler vapor port 8 is employed for extracting vapor from the boiling chambers 13. The condenser vapor port 10 is used to inject vapor into the condensing chambers 14, and the condenser liquid port 11 is used to extract condensate from the condensing cells 14.

Referring to FIGS. 2 and 6, the boiling and condensing stages of the vapor compression distillation process take place in a series of alternating boiling and condensing chambers 13 and 14 which are on opposite sides of the vertically extending common plate members 1. The feed material is caused to boil over the boiling surface 1b in the boiling chamber 13, the heat required to boil the feed material in the boiling chamber 13 being provided by the vapor condensing at a higher temperature in the adjacent condensing chamber 14. As compressed vapor condenses in the condensing chamber 14, its heat of vaporization is directed back into the boiling chamber 13 through the common plate member 1 under the influence of the differential temperature which exists between the adjacent boiling and condensing chambers.

To improve the overall heat transfer between the boiling and condensing chambers 13 and 14, rather than using a flat plate surface as disclosed in the hereinabove mentioned U.S. Pat. No. 4,671,856, the plate members 1 of the present invention are corrugated having a herringbone configuration 15 to provide a slanted flow path for the condensing film to flow down the condensing surface 1a at an angle to run-off areas 15a, FIG. 5, which carry a comparatively large volume of liquid off the plates 1 while occupying a comparatively small portion of the total surface area of the plates. The thickness of the film on the corrugated, herringbone portions 15 of the plates is thinner than the thickness of the film that would form on a flat plate of comparable dimensions, whereby the overall heat transfer coefficient between the condensing film and the common plate is increased, to thereby provide a greater overall heat transfer than would be obtained by employing a flat plate with comparable dimensions.

In order to achieve this improved efficiency, the common plate members 1 defining the condensing chamber 14, FIG. 6, are constructed and arranged to provide a plurality of contact points 14a where the condensing surfaces of the adjacent common plate members 1 come into near or direct contact. The contact points 14a serve as accumulation points for the liquid forming on the condensing surfaces of the common plate members 1. The accumulated liquid is caused to flow off the condensing surfaces in a plurality of diagonal flow paths provided by the herringbone configuration 15 and into run-off areas 15a. The herringbone configuration 15 also provides a plurality of diagonal vapor flow paths for directing the vapor conveyed from the boiling chambers 13 into the condensing chambers diagonally across the condensing chambers 13, rather than vertically downward, in order to assist the flow of liquid off the condensing surfaces.

While each row of the herringbone configuration shown in FIGS. 3, 5 and 10 consists of a single chevron, the configuration can consist of a plurality of chevrons in each row as shown in FIGS. 8 and 9, as at 16 and 17.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A boiler and condenser device comprising; a plate-in-frame heat exchanger including a plurality of vertically extending common plate members, a plurality of alternating boiling and condensing chambers on opposite sides of said common plate members, means for conveying feed material into said boiling chambers, means for conveying vapors from said boiling chambers into said condensing chambers, a face of each common plate member in a condensing chamber having a corrugated herringbone surface configuration, a plurality of diagonal vapor flow paths for directing vapors from the boiling chambers diagonally across the condensing chamber, the corrugated surfaces of oppositely facing adjacent common plate members having portions in abutting relationship to form contact points between adjacent common plate members, said contact points providing accumulation points for liquid forming on condensing surfaces of said common plate members, a plurality of diagonal liquid flow paths adjacent the diagonal vapor flow paths for directing the liquid to flow down the condensing surface into run-off streams, and a run-off area on the condensing surfaces communicating with the lower ends of the diagonal liquid flow paths for carrying a large volume of liquid off the plate members while occupying a small portion of the total surface area of the plate.

2. A boiler and condenser device as defined in claim 1, wherein the herringbone configuration comprises a plurality of rows having a chevron pattern.

3. A boiler and condenser device as defined in claim 2, wherein each row contains a plurality of chevrons.

* * * * *